United States Patent [19]

Takeuchi et al.

[11] Patent Number: 4,916,462

[45] Date of Patent: Apr. 10, 1990

[54] REFERENCE LINE SETTING SYSTEM FOR GRID PATTERN RECORDERS

[75] Inventors: Toshiyuki Takeuchi, Chigasaki, Japan; Alfred S. Krause, Glendora, Calif.

[73] Assignee: Graphtec Kabushiki Kaisha, Tokyo, Japan

[21] Appl. No.: 257,984

[22] Filed: Oct. 14, 1988

[30] Foreign Application Priority Data

Oct. 17, 1987 [JP] Japan .................. 62-158929

[51] Int. Cl.$^4$ .............................. G01D 9/00
[52] U.S. Cl. ................... 346/1.1; 346/76 PH
[58] Field of Search ............... 346/1.1, 76 PH

[56] References Cited

U.S. PATENT DOCUMENTS

| | | | |
|---|---|---|---|
| 3,689,937 | 9/1972 | Phillips et al. | 346/139 C |
| 3,774,226 | 11/1973 | Ballinger et al. | 346/35 |
| 3,792,481 | 2/1974 | Nagashima et al. | 346/1 |
| 3,815,144 | 6/1974 | Aiken | 346/35 |
| 3,840,878 | 10/1974 | Houston et al. | 346/76 R |
| 3,877,035 | 4/1975 | Miller et al. | 346/139 R |
| 3,971,041 | 7/1976 | Mason | 346/76 R |
| 3,980,169 | 9/1976 | Decker et al. | 197/55 |
| 4,038,664 | 7/1977 | Muir | 346/136 |
| 4,074,273 | 2/1978 | Dupree et al. | 346/34 |
| 4,085,407 | 4/1978 | Stratbucker et al. | 346/76 R |
| 4,096,484 | 6/1978 | Ferre et al. | 346/33 EC |
| 4,119,974 | 10/1978 | Ondis et al. | 346/145 |
| 4,134,062 | 1/1979 | Pizzuti et al. | 346/32 |
| 4,145,698 | 3/1979 | Wysong | 346/139 R |
| 4,151,397 | 4/1979 | Boor, Jr. et al. | 346/76 R |
| 4,168,505 | 9/1979 | Gaskill, Jr. et al. | 346/139 C |
| 4,205,395 | 5/1980 | Shortridge | 346/76 PH |
| 4,211,992 | 7/1980 | Gaskill, Jr. | 335/222 |
| 4,262,336 | 4/1981 | Pritchard | 364/474 |
| 4,332,193 | 6/1982 | Noyes | 101/93.01 |
| 4,369,452 | 1/1983 | Anno et al. | 346/76 PH |
| 4,393,386 | 7/1983 | Di Giulio | 346/75 |
| 4,425,571 | 1/1984 | Mueller et al. | 346/136 |
| 4,426,651 | 1/1984 | Mueller et al. | 346/136 |
| 4,442,442 | 4/1984 | O'Dell | 346/136 |
| 4,447,819 | 5/1984 | Moriguchi et al. | 346/76 PH |
| 4,455,578 | 6/1984 | Fearnside | 346/107 A |
| 4,456,951 | 6/1984 | Henneberger et al. | 364/131 |
| 4,462,704 | 7/1984 | Kurata et al. | 346/76 PH |
| 4,504,906 | 3/1985 | Itaya et al. | 364/200 |
| 4,536,778 | 8/1985 | De Schamphelaere et al. | 346/107R |
| 4,574,293 | 3/1986 | Inui et al. | 346/76 PH |
| 4,590,488 | 5/1986 | Sullivan | 346/76 PH |
| 4,595,303 | 6/1986 | Kuzuya et al. | 400/82 |
| 4,595,935 | 6/1986 | Brooks et al. | 346/76 PH |
| 4,607,262 | 8/1986 | Moriguchi et al. | 346/76 PH |
| 4,660,052 | 4/1987 | Kaiya et al. | 346/76 PH |
| 4,739,344 | 4/1988 | Sullivan et al. | 346/76 PH |

FOREIGN PATENT DOCUMENTS

| | | |
|---|---|---|
| 54-159928 | 11/1979 | Japan . |
| 55-97976 | 7/1980 | Japan . |
| 55-156080 | 12/1980 | Japan . |
| 58-31022 | 2/1983 | Japan . |
| 58-29990 | 7/1983 | Japan . |

OTHER PUBLICATIONS

Thermal Printer with In-Memory Scan-Line Composition, IBM Technical Disclosure Bulletin, vol. 22, No. 5, Oct. 1979, p. 2022.

Collier's Encyclopedia, The Crowell-Collier Publishing Company, 1962, vol. 8, pp. 226 and 232.

*Primary Examiner*—Bruce A. Reynolds
*Assistant Examiner*—Huan Tran
*Attorney, Agent, or Firm*—Benoit Law Corporation

[57] ABSTRACT

When selecting a coordinate grid pattern within which to record data on a chart, a line of such grid pattern is selected as a reference line recordable by one of the elements of a recording head. A reference level corresponding to that reference line is provided. One heating element is ranked in terms of position across the thermal recording head. A discrepancy in ranking between that one heating element and a heating element of the recording head with which the reference level is recorded on the chart is noted. A shifting in ranking pursuant to such a noted discrepancy is effected until the heating element with which the reference level is recorded and the above mentioned one heating element with which the reference line of the grid pattern is recorded have become identical.

20 Claims, 6 Drawing Sheets

REFERENCE LINE SETTING SYSTEM FOR GRID PATTERN RECORDERS

BACKGROUND OF THE INVENTION

1. Field of the Invention

The subject invention relates to printout recording with data recording heads including a plurality of clocked recording elements and, more specifically, to reference line setting systems for grid pattern recorders.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitations in a preamble serve the purpose of providing antecedents for the remainder of a statement of invention or claim.

Efforts to provide operable and efficient recorders with thermal printheads have been of long standing and were to no small part prompted by inadequacies of moving coil galvanometer-type recording apparatus, which have inherent limitations despite various improvements, including those disclosed in U.S. Pat. No. 4,134,062 by Pizzuti et al, issued Jan. 9, 1979 to Atlan-Tol Industries, Inc., for a limited rotation instrument rebalance apparatus employing a wiper having vibration damping, and U.S. Pat. No. 4,211,992, by D. M. Gaskill, Jr., issued July 8, 1980 to Atlan-Tol Industries, Inc., for positioning means for a limited rotation motor.

For an example of a moving coil thermal recorder, reference may be had to U.S. Pat. No. 3,689,937, by Phillips et al, issued Sept. 5, 1972 to Evershed & Vignoles Limited, for thermal recording styli and control circuits therefor.

The development of thermal recorders also has benefited from the development of transverse recorders as disclosed, for instance, in U.S. Pat. No. 3,774,226, by Ballinger et al, issued Nov. 20, 1973 to Honeywell Inc., and disclosing a plurality of recording elements arranged across the recording medium to define a transverse recording line.

Thermal recording media also developed into different forms as may, for instance, be seen from U.S. Pat. No. 3,792,481, by Nagashima et al, issued Feb. 12, 1974 to Canon K.K., for recording by heat sensitive multicolor indication, disclosing suitable heat sensitive materials.

An array of heat producing elements is disclosed in U.S. Pat. No. 3,815,144, by H. H. Aiken, issued June 4, 1974, for Thermal Recorder Having an Analogue to Digital Converter. In this respect, an analog-to-digital converter for a magnetic transverse recorder was disclosed in the above mentioned Ballinger et al U.S. Pat. No. 3,774,226.

A computer controlled chart advance is disclosed in U.S. Pat. No. 3,840,878, by Houston et al, issued Oct. 8, 1974 to Texas Instruments Incorporated, for a dual mode thermal recorder. An event marker for graphic recorders has been disclosed in U.S. Pat. No. 3,877,035, by Miller et al, issued Apr. 8, 1975 to Leeds & Northrup Company, and showing also a print element suspension. Another print element suspension is shown in U.S. Pat. No. 3,980,169, by Decker et al, issued Sept. 14, 1976 to Triumph Werke Nurnberg A.G., for an impact control for a single element printer.

A chart recorder using a fixed thermal printhead is disclosed in U.S. Pat. No. 3,971,041, by C. F. Mason, issued July 20, 1976 to Esterline Corporation, and disclosing a marginal array of heat generating dots in addition to a single row of heat generating dots along the printhead. A recording control or chart lock is disclosed in U.S. Pat. No. 4,038,664, by A. R. Muir, issued July 26, 1977 to The Perkin-Elmer Corporation. A sequential value mutli-point recording device with unidirectional can is disclosed in U.S. Pat. No. 4,074,273, by Dupree et al, issued Feb. 14, 1978 to The Dow Chemical Company.

Even after the development of thermal printheads, resort still was had to the use of mechanical recording stylii as may, for instance, be seen from U.S. Pat. No. 4,085,407, by Stratbucker et al, issued Apr. 18, 1978 to Health Technology Laboratories, Inc., and U.S. Pat. No. 4,096,484, by Ferre et al, issued June 20, 1978 to Edo Western Corporation, for a graphic recording system including a plurality of memories for storing information received over different channels for recording with different recording devices.

The recording apparatus disclosed in U.S. Pat. No. 4,119,974, by Ondis et al, issued Oct. 10, 1978 to Atlan-Tol Industries, Inc., employed both a thermal recording head and a thermal recording stylus.

A real breakthrough is apparent from U.S. Pat. No. 4,145,698, by R. D. Wysong, issued Mar. 20, 1979 to Shakespeare Marine Electronics, Inc., and subsequently assigned to Holly Springs of Florida Incorporated, and by them to the common assignee of the entire interest hereof. In particular, that Wysong patent shows a thermal printhead biasing arrangement using, in its own words, a helical compression spring for biasing at least one thermal printhead into tangential contact with the thermal printing paper. That Wysong patent also discloses an arrangement of two thermal printheads in substantially aligned, substantially abutting end-to-end relation with each other so that the longitudinal dimensions of these printheads are in substantially transverse relation to the chart at the printing station and so that the printheads engage that chart on the opposite side thereof from the chart advancing means. That Wysong patent also discloses mounting means independently mounting the first and second printheads so that they are independently movable toward the chart. The helical compression springs are also arranged in this Wysong patent for independently biasing the first and second printheads towards the chart. Independent biasing of several thermal printheads with helical compression springs has also been disclosed in U.S. Pat. No. 4,151,397, by Boor, Jr. et al, issued Apr. 24, 1979 to E-Systems, Inc.

A thermal recording stylus usable in the above mentioned Ondis et al U.S. Patent 4,119,974 was subsequently disclosed in U.S. Pat. No. 4,168,505, by Gaskill, Jr. et al, issued Sept. 18, 1979 to Atlan-Tol Industries, Inc.

Microprocessor-controlled multiple-head thermal recorders have been disclosed by Markson et al, in an illustrated article entitled Thermal Printer with In-Memory Scan-Line Composition in the IBM Technical Disclosure Bulletin, vol. 22, No. 5 (October 1979), p. 2022, and in U.S. Pat. No. 4,205,395, by E. J. Shortridge, issued May 27, 1980 to Shakespeare Marine Electronics, Inc.

U.S. Pat. No. 4,262,336, by E. K. Pritchard, issued Apr. 14, 1981 for a Multi-Axis Contouring Control System in which a host computer and multi-processor system is shared with a master controller, and a slave controller controlled by part of the master controller.

A thermal line printer with a plurality of printheads has also been disclosed in U.S. Pat. No. 4,332,193, by B. P. Noyes, issued June 1, 1982. A thermal recording head and a drive therefor have been disclosed in U.S. Pat. No. 4,369,452, by Anno et al, issued Jan. 18, 1983 to Tokyo Shibaura Denki K.K.

U.S. Pat. No. 4,393,386, by P. C. Di Giulio, issued July 12, 1983 to Pitney Bowes, Inc., for Ink Jet Printing Apparatus also discloses application of the above mentioned host computer, multi-processor, master and slave controller system to printing apparatus.

U.S. Pat. No. 4,425,571, by Mueller et al, issued Jan. 10, 1984 and U.S. Pat. No. 4,426,651, by Muellner et al, issued Jan. 17, 1984, both to The Perkin-Elmer Corporation, also show control of the chart advance from a microprocessor. A data synchronization system for graphic recording apparatus has been disclosed in U.S. Pat. No. 4,442,442, by G. B. O'Dell, issued Apr. 10, 1984 to Tektronix, Inc.

U.S. Pat. No. 4,447,819, by Moriguchi et al, issued May 8, 1984 to Fuji Xerox Co., Ltd., discloses thermal recording apparatus including a control for determining a number of blocks to be simultaneously driven to perform recording without exceeding the capacity of the power source.

U.S. Pat. No. 4,455,578, by W. T. Fearnside, issued June 19, 1984 to Eastman Kodak Company, for Electronics for Arrayed Photosources discloses controlled circuitry in which each sub-array of LED recording devices was controlled by its own control assembly governed by a sequence controller with the aid of clock generator circuits. That patent also discloses replacement of a prior-art print enable signal by binary weighted pulses derived from clock generator circuits, which also supply a shift frequency pulse train instead of the prior-art weighted frequency clock. This could easily be implemented as a master/slave control arrangement of the type employed for millions of years. In particular, it became known some time ago that the so-called "second brain" of the kind of dinosaur called "Stegosaurus" actually was an enlargement of the spinal chord in the hip region which, in turn, was controlled from the actual brain in the head through the spinal chord. In other words, the enlargement of the spinal chord in the hip region actually was a slave of the master controller in the head brain that also included the host computer which processed the sensory signals received from the eyes, ears and other sensors and which applied corresponding signals to the "master controller" for energizing the fore part of the animal and for actuating the "slave controller" in the hip region to energize the hind portion of the animal. Reference may in this respect be had to COLLIER'S ENCYCLOPEDIA (The Crowell-Collier Publishing Company, 1962), vol. 8, pp. 226 and 232.

Numerical machine tool controls also employ several processors and monitoring circuits as may, for instance, be seen from U.S. Pat. No. 4,456,951, by Henneberger et al, issued June 26, 1984 to Siemens Aktiengesellschaft.

U.S. Pat. No. 4,462,704, by Kurata et al, issued July 31, 1984 to Fuji Xerox Co., Ltd., discloses a thermal head driving system with selective energization of printheads in parallel relation, including prior-art systems (FIGS. 1-3) and a pulse generator for producing drive pulses having a width determined in accordance with a ratio of a resistance value of each thermal head (FIGS. 4 and 5).

U.S. Pat. No. 4,504,906, by Itaya et al, issued Mar. 12, 1985 to Anritsu Electric Company Limited, discloses a multiprocessor system comprising a plurality of central processing units periodically and cyclically enabled to access a bus for data transfer from one unit to another.

U.S. Pat. No. 4,536,778, by De Schamphelaere et al, issued Aug. 20, 1985 to AGFA-Gevaert N.V., discloses recording apparatus with modular LED arrays of higher production yield.

Appropriate control of the heat of thermal heads can be an important factor, as may be seen from U.S. Pat. No. 4,574,293, by Inui et al, issued Mar. 4, 1986 to Fuji Xerox Co., Ltd., for a compensation for heat accumulation in a thermal head. Electric energy to be applied to each heating element of the thermal head is controlled by taking into account the energy applied to the heating element up to two scan periods before, as well as the effect of heat accumulated in heating elements surrounding the heating element, and then the energy thus controlled is recorrected taking into consideration the temperature change in a thermal head base plate or the change in printing time between lines.

U.S. Pat. No. 4,590,488, by M. J. Sullivan, issued May 20, 1986 to Astro-Med, Inc., discloses a circuit for controlling energization of a thermal print head, by varying the pulse width of head energization depending on the head temperature which is fed back to the circuitry.

An example of different controls for printing apparatus may also be seen from U.S. Pat. No. 4,595,303, by Kuzuya et al, issued June 17, 1986 to Brother Kogyo K.K., for printing apparatus with two print heads. A system for detecting defective thermal printhead elements has been disclosed in U.S. Pat. No. 4,595,935, by Brooks et al, issued June 17, 1986 to NCR Canada Ltd.

U.S. Pat. No. 4,607,262, by Moriguchi et al, issued Aug. 19, 1986 to Fuji Xerox Co., Ltd., discloses a thermal head drive circuit and describes a transfer-type heat sensitive recording medium responsive to selective energization of the thermal printhead for selectively producing markings on a chart or an ordinary sheet of paper. That patent also discloses prior-art thermal head drive circuits (FIGS. 1-3) and head drive circuits with a heat accumulation calculating unit for calculating the heat residual from prior recording steps and from data recorded on neighboring recording elements (FIGS. 4-11).

U.S. Pat. No. 4,613,872, by Naito et al, issued Sept. 23, 1986, discloses a recorder which records analog input waveforms and converts analog input data into digital data at regular intervals and at selected times records the digital data in the form of a list of data alongside of the analog input waveforms together with the time and other information. When analog waveforms and characters are recorded in side-by-side relation, the speed at which the paper is fed is changed from that employed when only analog waveforms are recorded, whereby the list of data can be quickly recorded.

U.S. Pat. No. 4,660,052, by Kaiya et al, issued Apr. 21, 1987, for heat sensitive recording apparatus discloses a plurality of elongate thermal printheads mounted so that the longitudinal dimension thereof are in substantially transverse relation to the recording chart at the printing station and at fixed positions in the transverse extent of the chart. As disclosed in that patent, the printheads are disposed adjacent different longitudinally extending sections of the chart and cooperate to define a substantially continuous printing width which extends substantially across the width of the chart at the printing station.

U.S. Pat. No. 4,748,454, by Ikeda et al, issued May 31, 1988 to Nihon Kohden Corporation, discloses a dot array recorder having an LED level meter arranged to correspond position array to a dot array head, to indicate printed dot position.

U.S. Pat. No. 4,748,455, by Masaaki Mori, issued May 31, 1988 to Ricoh Company, Ltd., discloses systems for driving a thermal print head including a plurality of heat-producing elements which are activated selectively in accordance with digital image data obtained from an analog image signal is provided. In one aspect, the driving system is so structured to insert additional data between any two adjacent image data whenever the space between the two exceeds a predetermined level thereby allowing to maintain the dot density at constant when printed. In another aspect, that driving system controls the time period of activation of each of the heat-producing elements in accordance with preheat control data obtained by carrying out inverting and AND processing between each of the digital image data of one print line and the corresponding each of the digital image data of the next following print line (FIGS. 11 to 13). In a further aspect, that driving system has a structure such that a reference point in a print line may be set at a desired location along the print line.

Japanese Utility Model Publication 54-159928, by Motoo Kuroiwa et al, Hokuso Kaihatsu Tetsudo K.K., published Nov. 8, 1979, discloses a thermal dot printer in which heads are alternatively energized.

Japanese Patent Publication 55-97976, by Wakabayashi et al, Japanese National Railways and Nihon Singo K.K., published July 25, 1980 discloses a thermal printer wherein several printheads are mounted side by side and are independently biased from each other. In one embodiment, the thermal printheads are mounted on a crankshaft having a crank so that the thermal heads are collectively moved up and down when the crankshaft is driven by an electric motor. Another embodiment provides a slight play or gap in a junction between each of the thermal heads and the crankshaft, and pressure is exerted on the thermal head by use of compression springs. However, freedom of each thermal head at its supporting portion is excessively limited, since there is only a slight play or gap in the junction between each thermal head and the crankshaft.

Japanese Patent Publication 55-156080, by Shinshu Seiki Co., Ltd. et al, published Dec. 4, 1980, discloses a different approach in which one or two thermal heads are reciprocated transversely of the recording paper. That Patent Publication also shows circuitry for effecting and controlling the energization of the two thermal printheads.

Japanese Patent Publication 58-31022, by T. Dobashi, Nippon Denshin Denwa Kosha, published Feb. 24, 1983, discloses a processor controlling system having a common memory of a main control processor and a processor to be controlled, and a control circuit for sending out control signals to the processor to be controlled, in accordance with a control order from the main control processor. Japanese Patent 60-29990, issued from Japanese Patent Publication 58-112170, by H. Takatsudo, Casio Keisanki K.K., published July 4, 1983, discloses an electronic register with automatic load control circuitry.

For a summary of the prior art, reference may be had to the recently issued U.S. Pat. No. 4,739,344, by Sullivan et al, issued Apr. 19, 1988 1988 to Astro-Med, Inc., for a chart recorder having multiple thermal printheads mounted so that the longitudinal dimensions thereof are in substantially transverse relation to the chart at the printing station and at fixed positions in the transverse extent of the chart. That Sullivan et al patent also claims, but does not otherwise disclose, the printheads being disposed adjacent different longitudinally extending sections of the chart and cooperating to define a substantially continuous printing width which extends substantially across the width of the chart at the printing station, as disclosed in the above mentioned Kaiya et al U.S. Pat. No. 4,660,052.

That Sullivan et al patent also shows and describes the mounting of elongate printheads in substantially aligned, substantially abutting end-to-end relation with each other so that the longitudinal dimensions of the elongate printheads are in substantially transverse relation to the chart, as disclosed, for instance, in the above mentioned Wysong U.S. Pat. No. 4,145,698 and in the above mentioned IBM Techninical Disclosure Bulletin Publication by Markson et al. That Sullivan et al patent also describes and shows the kind of independent biasing of each recording head disclosed in the above mentioned Wysong U.S. Pat. No. 4,145,698, Boor et al U.S. Pat. No. 4,151,397, and Wakabayashi et al Japanese Patent Publication 55-97976. That Sullivan et al patent also describes and shows microprocessor control systems including a master/slave control of the above mentioned kind applied to energization of two thermal printheads.

That Sullivan et al, U.S. Pat. No. 4,739,344 also describes master and slave history circuits shown at 40 and 60 in FIGS. 2 and 2a and disclosed by reference to the above mentioned Inui et al, U.S. Pat. No. 4,574,293, Moriguchi et al, U.S. Pat. No. 4,607,262, and Sullivan U.S. Pat. No. 4,590,488.

Moreover it is known with respect to waveform recorders that the provision of making graduation lines pictured on a recording paper harmonize with a signal to be measured of reference voltage level leads to the advantage that the reading of data recorded is facilitated.

Among conventional recorders of such a kind, there is the so-called pen-writing type of waveform recorder, shown by way of example in the above mentioned Miller et al, U.S. Pat. No. 3,877,035. The pen-writing type waveform recorder produces a waveform record using a pen which is supported on a recording paper previously printed with graduation lines, and because of its configuration, it is comparatively easy to make the graduation lines of the recording paper harmonize with a signal to be measured of reference voltage level. Specifically, since the point of the pen for picturing a record line and the graduation lines of the recording paper are related with each other so that a user can inspect them visually, positional alignment can be readily attained.

However, visual inspection generally cannot be applied to a thermal chart recorder, because its portion where recording is executed is located on the back side of a thermal head. Further, the setting of a reference value as described above cannot be carried out, because the section pattern is recorded concurrently with recording of the analog signal.

In the ordinary type of thermal chart recorder, such adjustment is automatically performed by a processor included in a record processing unit by means of a software.

However, since such adjustment is automatically carried out by the recorder itself, the user cannot practically ascertain whether or not the analog signal is precisely in agreement with the section pattern, and thus always feels uneasy. Since a thermal head incorporated generates 8 dots/mm or 16 dots/mm, it is difficult to make these dots harmonize with graduation lines of a recording paper accurately.

SUMMARY OF THE INVENTION

It is an object of this invention to overcome the latter disadvantages.

It is a germane object of this invention to provide for accurate recording of data in grid patterns.

It is a related object of this invention to enable exact verification that data will be recorded accurately in a given grid pattern.

It is also an object of this invention to provide an improved indication when data will be recorded accurately in a selected grid pattern.

It is a related object of the invention to retain a chosen reference line when grid patterns for recording are expanded or contracted, preferably in digital increments.

Other aspects of the invention will become apparent in the further course of this disclosure.

From a first aspect thereof, the subject invention resides in methods and apparatus for providing a data record with a thermal recording head including a plurality of clocked heating elements, and, more specifically, resides in the improvement comprising in combination the steps of, or means for, controlling such records in density by continually storing for each of the heating elements a present moment recording datum and further recording data including a one-clock-interval-old recording datum and a two-clock-interval-old recording datum for the particular heating element, continually generating for each heating element from the present moment recording datum to be recorded a first dot recording energization quantum and for each of the mentioned further dot recording data having been printed a dot recording energization pause and for each blank value of such further dot recording data a further dot recording energization quantum, and sequentially energizing the heating elements with dot recording quanta thus generated.

A preferred embodiment of the invention includes inserting for each one-clock-interval-old recording datum having been printed by the particular heating element an energization pause between a dot recording energization quantum corresponding to a blank value of the immediately preceding two-clock-interval-old recording datum and the above mentioned first dot recording energization quantum representing the then present moment recording datum.

Other aspects of the invention will become apparent in the further course of this disclosure, and no restriction is intended by this Summary of the Invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 2 is an explanatory diagram showing in greater detail an important portion of the thermal chart recorder of FIG. 1, in which

DESCRIPTION OF PREFERRED EMBODIMENTS

Figure 1:
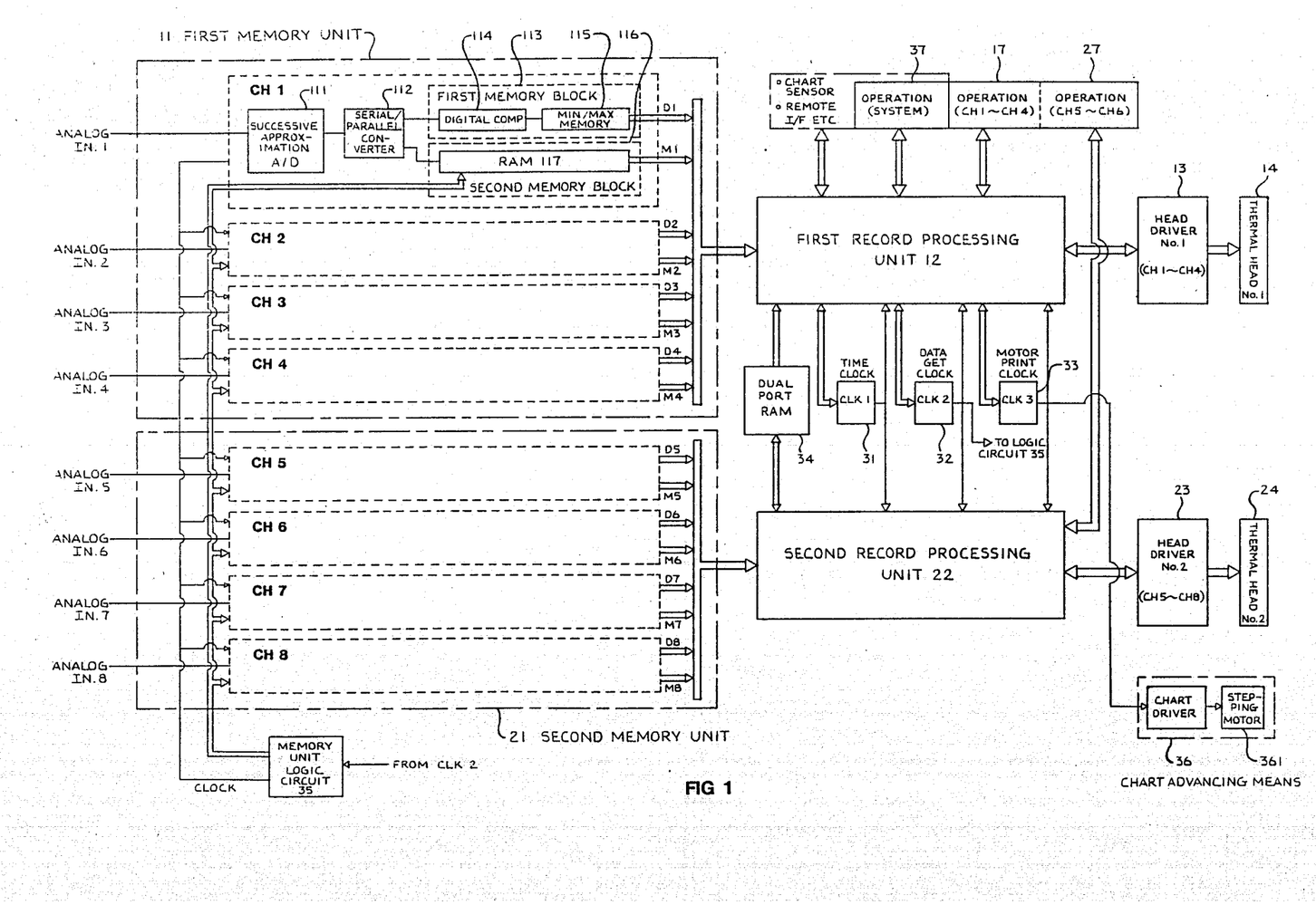
FIG. 1 is a block diagram showing the general configuration of a thermal chart recorder embodying the present invention.

FIG. 1 is a block diagram showing a preferred embodiment of a thermal chart recorder according to the present invention, which is designated by reference numeral 1.

The thermal chart recorder 1 has a first recorder block, a second recorder block, and a matching block for matching these two recorder blocks with each other.

The first recorder block has a first memory unit 11, a first record processing unit 12, a first thermal head driver 13, a first thermal head 14, and a first recorder block operation unit or keyboard 17.

The second recorder block has a second memory unit 21, a second record processing unit 22, a second thermal head driver 23, a second thermal head 24, and a second recorder block operation unit or keyboard 27.

The matching block has a first clock generator 31, a second clock generator 32, a third clock generator 33, a dual port RAM 34, a memory unit logic circuit 35, a chart advancing circuit or means 36, and a system operation unit or keyboard 37.

The first memory unit 11 of the first recorder block is identical in structure with the second memory unit 21 of the second recorder block. The first memory unit 11 has four channel blocks CH.1–CH.4 for storing corresponding signals of channels 1 through 4 to be recorded. Similarly, the second memory unit 21 has four channel blocks CH.5–CH.8. These channel blocks are identical in structure, hence, the configuration of the channel block CH.1 only will now be described.

The channel block CH.1 has a successive approximation A/D converter 111, a serial/parallel converter 112, a first memory block 113, and a second memory block 116. The first memory block 113 has a digital comparator 114 and a min./max. memory 115, which temporarily stores the maximum and minimum values, appearing in a given interval, of a signal, Analog. In.1, to be recorded. This first memory block 113 is used in a direct mode hereinafter described.

On the other hand, the second memory block 116 is made of a RAM 117 and adapted to a successively store digital values obtained by converting the signal, Analog In.1, to be recorded. This second memory block 116 is used in a memory mode hereinafter described.

Either or both of the direct mode and the memory mode can be selected simultaneously by the system operation keyboard 37 of the matching block.

The record processing units of the embodiment will now be described. Since the first record processing nit 12 of the first recorder block and the second record processing unit 22 of the second recorder block are identical in structure, only the first record processing unit 12 and its relationship with other components will now be described with reference to FIG. 2A mainly showing this unit 12.

Figure 2A:
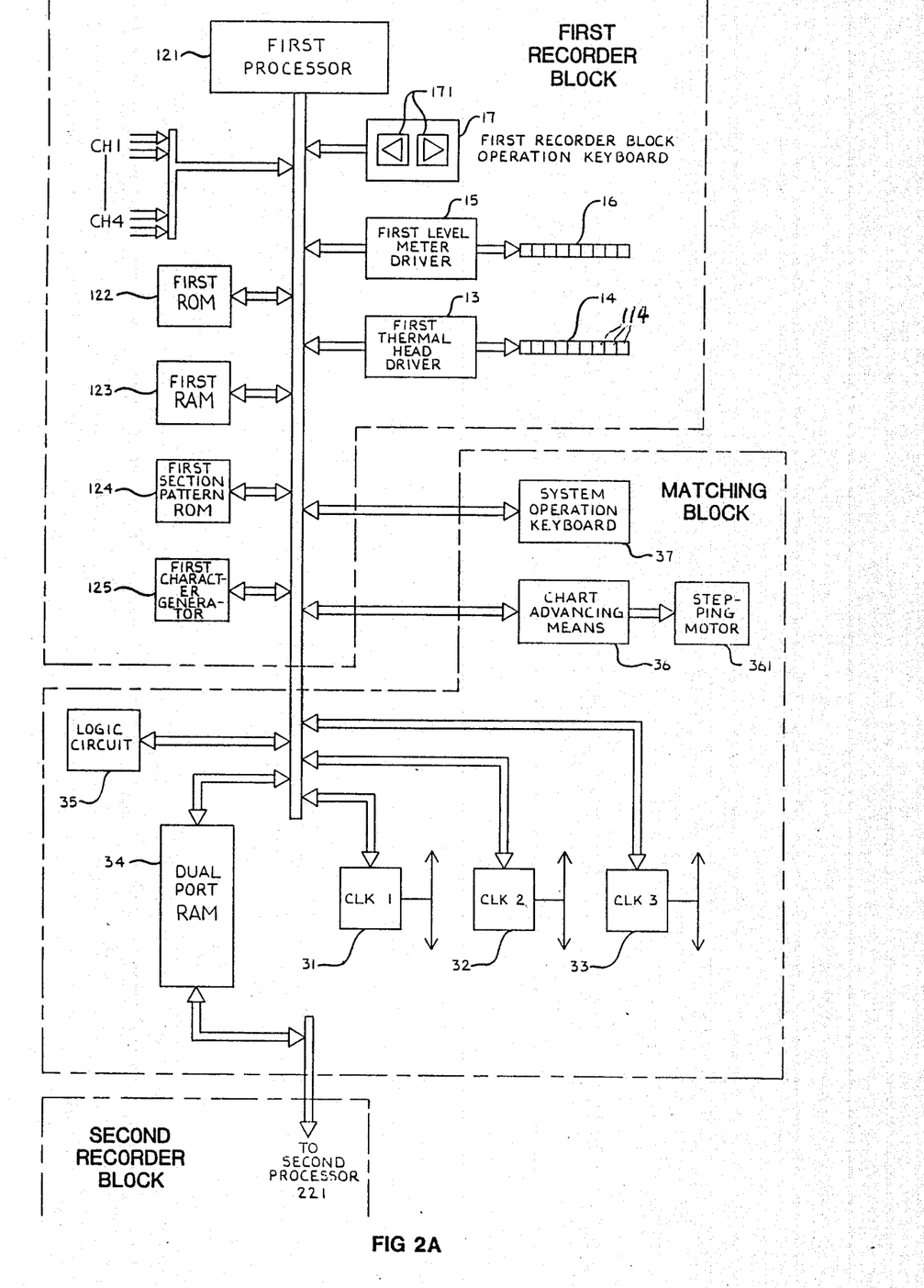
FIG. 2A is a detailed block diagram.

The first record processing unit 12 has a first processor 121, a first ROM 122, a first RAM 123, a first section pattern ROM 124 (coordinate graduation or grid pattern), and a first character generator 125. Stored in the first ROM 122 are a system program which determines the general operation of a unit capable of read-out under control of the first processor 121 and a first recorder block control program which controls recording of the signals to be recorded of the first recorder block, i.e. the signals of CH.1-CH.4.

The first RAM 123 temporarily holds data during the record processing of the first recorder block under control of the first processor 121. The first section pattern ROM 124 has several section patterns stored therein which are used to picture a section (coordinate graduation or grid pattern) line group in the form of a lattice on a chart. The section pattern is selected by means of the system operation keyboard 37 of the matching block or the first recorder block operation keyboard 17, and its read-out operation is started by the first processor 121. The first character generator 125 is used to record characters or symbols, and these characters or symbols are selected by means of the system operation keyboard 37 of the matching block or the first recorder block operation keyboard 17 and selectively read out by the first processor 121. The data thus processed by the foregoing components are sent under control of the first processor 121 to the first thermal head driver 13 and to a first level meter driver 15 (which is omitted from FIG. 1 to avoid crowding) so that the analog input signal given is recorded by the first thermal head 14 and indicated by a first level meter 16. The first recorder block operation keyboard 17 of the first record processing unit 12 is used also to set various conditions which are used to subject the signals to be recorded of CH.1-CH.4 to a given record processing.

The second record processing unit 22 of the second recorder block is substantially identical in structure with the first record processing unit 12, but this second record processing unit 22 is used to process the signals to be recorded of CH.5-CH.8, not of CH.1-CH.4; therefore, an operation keyboard 27 for CH.5-CH.8 is connected instead of the operation keyboard 17 for CH.1-CH.4.

The first processor 121 of the first record processing unit 12 functions as the matching block for matching the first record processing unit 12 and the second record processing unit 22 with each other, that is, it controls the memory unit logic circuit 35 and the chart advancing means 36. The memory unit logic circuit 35 controls the operation of the first memory unit 11 and of the second memory unit 21. The chart advancing means 36 causes its stepping motor 361 to feed the chart at given speed.

As the matching block for matching the first record processing unit 12 and the second record processing unit 22 with each other, the first clock generator 31, second clock generator 32, third clock generator 33, and dual port RAM 34 are coupled between the first processor 121 of the first record processing unit 12 and a second processor 221 of the second record processing unit 22.

To set various conditions in the thus configured matching block for the first record processing unit 12 and the second record processing unit 22, the system operation keyboard 37 is coupled to the first record processing unit 12.

Figure 2B:
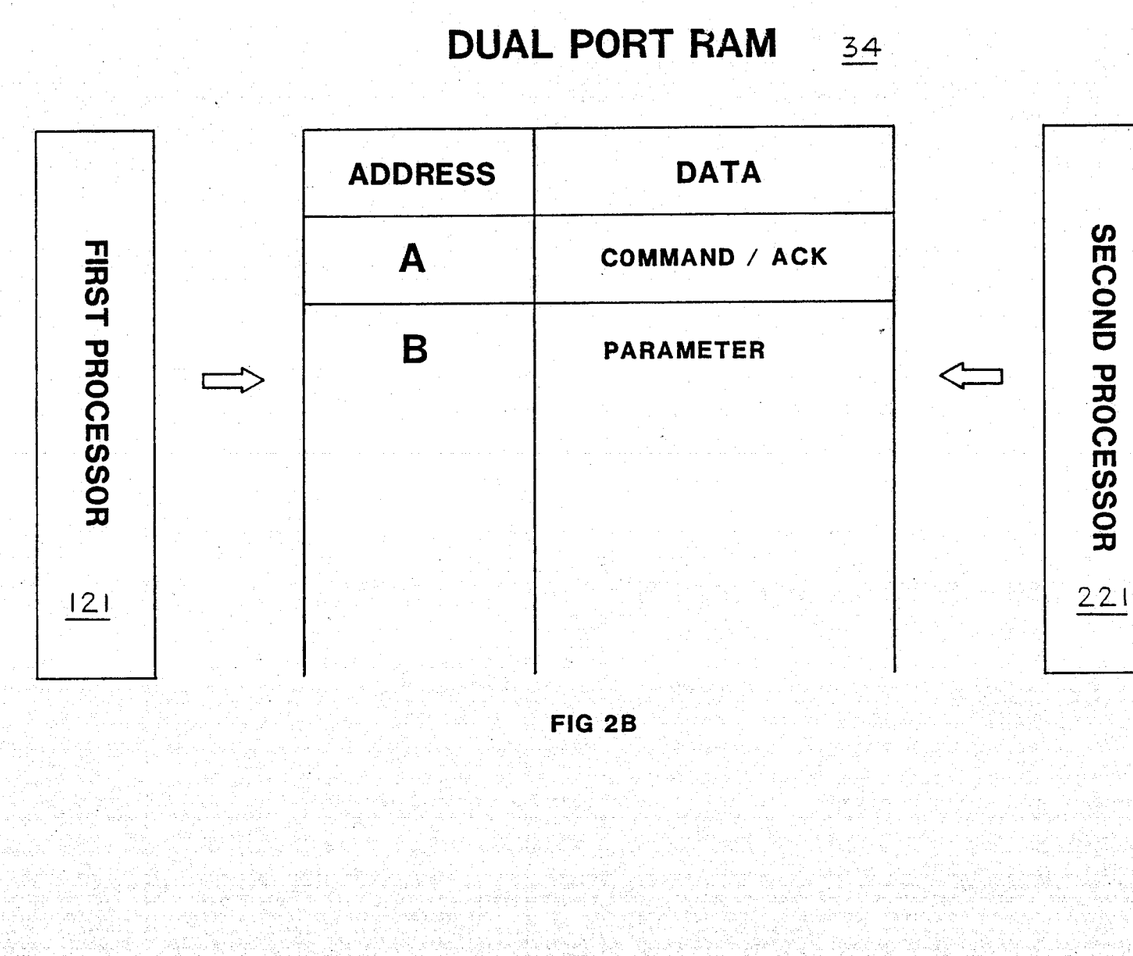
FIG. 2B is a diagram explanatory of the operation of a dual port RAM used in FIG. 1.

FIG. 2B is a diagram explanatory of the operation of the dual port RAM 34 of the matching block.

At the initial stage of use of the recorder, it is necessary for a user to set the state or conditions of the recorder. The setting in the embodiment is achieved by means of the system operation keyboard 37 shown in FIG. 2A. Here, assume that the user has just set the chart advancing speed and/or the mode of the memory unit. A command signal for execution of the setting is sent from the system operation keyboard 37 to the first record processing unit 12 at first. The first processor 121 decodes the command signal received, sets the first record processing unit 12 in the designated state, and writes the command signal in the dual port RAM 34.

The format of writing is such that as shown in FIG. 2B, for example, the foregoing command is written in address A of the dual port RAM 34 and its parameters in address B. Upon writing of the command in the dual port RAM 34, the second processor 221 of the second record processing unit 22 begins to operate, so that address A of the dual port RAM 34 is first read into the second record processing unit 22. Then, the parameters of address B are read into the second record processing unit 22.

To notify the first processor 121 that the command and parameters have been read in, the second processor 221 writes an ACK code in address A of the dual port RAM 34. The foregoing completes the transfer of one command and its parameters, and thereafter, other various commands and data are transferred in a similar manner. Then, the second processor 221 sets the second record processing unit 22 in the same designated state as for the first record processing unit 12.

Referring to FIG. 2A, all the three clock generators 31, 32 and 33 are put in operation in response to an instruction from the first processor 121 of the first record processing unit 12. The first clock generator 31 generates a time clock which is used to print time marks on the chart at given intervals of, for example, one second or ten seconds. The second clock generator 32 generates a process clock for the first and second memory units 11 and 21, which is used as a take-in clock for the analog signal to be recorded or as a memory control clock. This clock is used to control the memory units logic circuit 35 in response to the first processor of the first record processing unit 12. The third clock generator 33 generates a chart advance and print clock which is used to control the process of the first and second record processing units 12 and 22 and the advancing action of the chart advancing means 36.

The operation of the thus configured recorder of the present invention will now be described.

The user first sets the general conditions (chart speed, mode, etc.) of the recorder by means of the system operation keyboard 37.

In response to such setting the first processor 121 of the first record processing unit 12 sets the first record processing unit 12 in the designated state and writes the command signals in the dual port RAM 34 in such a manner as described above. The second processor 221 of the second record processing unit 22 reads out the command signals written in the dual port RAM 34 and sets the second record processing unit 22 in the designated state.

Here, assume that the recorder has just been set to the direct mode by means of the system operation keyboard 37. The first processor 121 sends a command to the second clock generator 32 to cause it to generate a predetermined clock CLK2. This clock CLK2 is applied to the memory unit logic circuit 35 under control of the first processor 121 to control its operation. The memory unit logic circuit 35 includes no processor, thus is made in the form of a hardware logic circuit. In response to the foregoing clock the memory unit logic circuit 35 controls taking of the analog signals into the individual channel blocks CH.1–CH.8 and writing thereof into the memories.

Each channel bock receives the analog signal (Analog In.1–Analog In.8) which is converted by the successive approximation A/D converter 111 into digital values. These digital values thus produced are successively applied through the serial/parallel converter 112 to the digital comparator 114 where a maximum value and a minimum value appearing in a given interval are selected, these maximum and minimum values selected in relation to each given interval being successively stored in the min./max. memory 115.

The foregoing series of processes will now be described in greater detail with taking the channel block CH.1 as an example.

Figure 3:
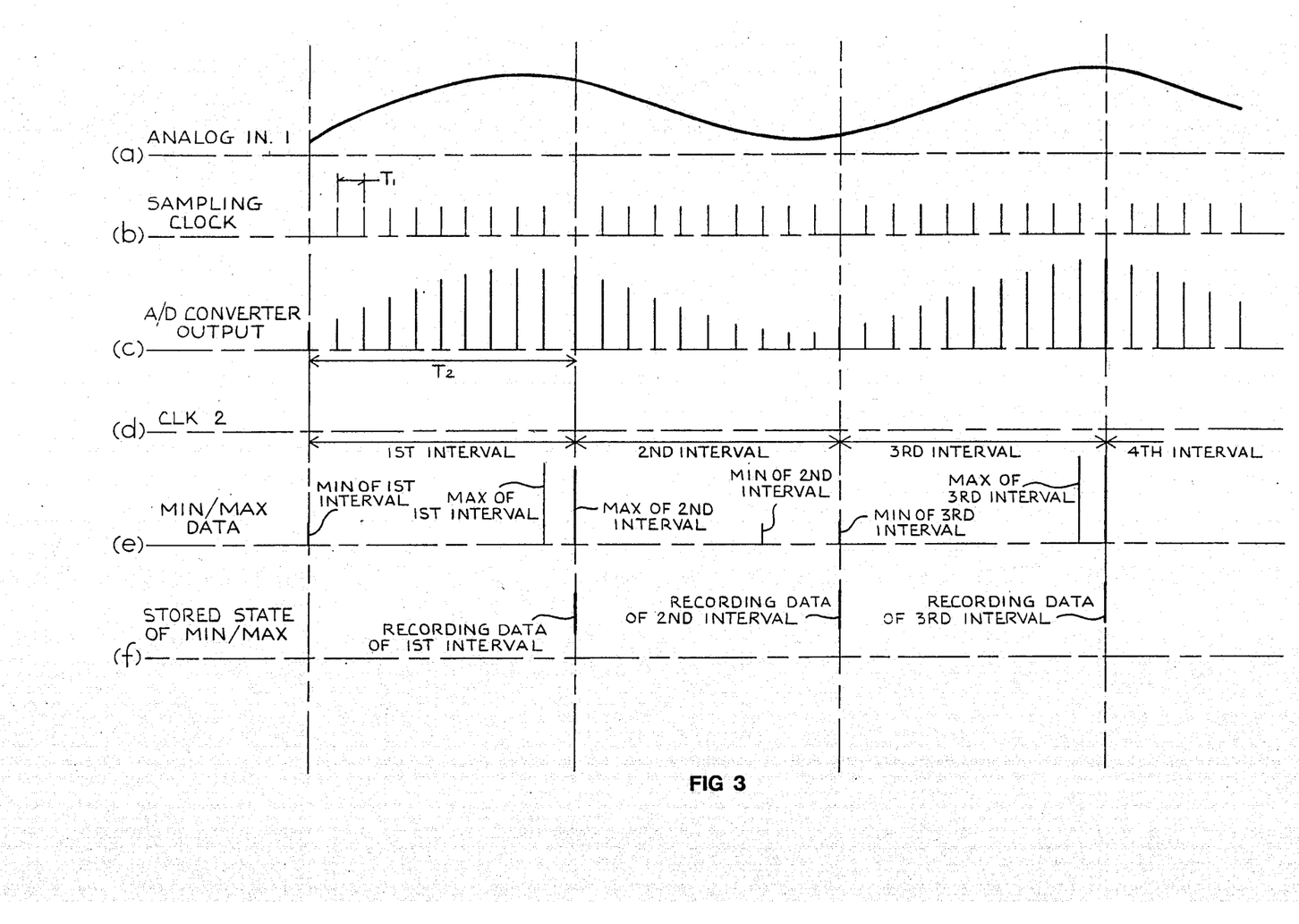
FIG. 3 is a timing diagram showing the data take-in and read-out operation of the recorder of FIG. 1.

FIG. 3 is an explanatory diagram showing the timing of the foregoing processes. Specifically, FIG. 3(a) illustrates the input analog signal, Analog In.1, of CH.1; FIG. 3(b) a sampling clock generated at a period shorter than that of the clock CLK2 of the second clock generator 32 in response thereto; FIG. 3(c) the output of the successive approximation A/D converter 111; FIG. 3(d) the clock CLK2 of the second clock generator 32; FIG. 3(e) the data or the maximum value and the minimum value appearing in each interval defined by the clock CLK 2; and FIG. 3(f) the data stored in the min.-/max. memory 115 of the first memory block 113.

The signal to be measured, Analog In.1, shown in FIG. 3(a) is applied to the successive approximation A/D converter 111 where it is converted into the digital values [FIG. 3(c)] on the basis of the sampling clock (of period T1) shown in FIG. 3(b). These digital values are successively compared with one another in the digital comparator 114 so that the maximum value and the minimum value are selected. These maximum and minimum values thus selected with respect to each interval defined by the clock CLK2 (of period T2; T2=n T1) are stored in the min./max. 115.

Then, the data thus stored in the first memory blocks 113 of the channel blocks CH.1–CH.8 are sent to the first record processing unit 12 in the case of CH.1–CH.4, or to the second record processing unit 22 in the case of CH.5–CH.8.

The first record processing unit 12 and the second record processing unit 22 perform a given series of processes on the basis of the clock CLK3 of the third clock generator 33 and send the data to be recorded to the head drivers 13 and 23, respectively, whereby desired recording is achieved by the thermal heads 14 and 24. The manner of processing for record will now be described in greater detail.

The data or the maximum values and the minimum values held in the min./max. memories 115 are successively read out in relation to each interval defined by the clock CLK2 and sent to the corresponding record processing unit 12 or 22.

The period of the clock CLK3 of the third clock generator 33 which determines the print and chart advancing speed has a certain relation to the chart advancing speed set by means of the system operation keyboard 37.

Here, let T2 be the period of the clock CLK2 which determines the interval for selection of the maximum and minimum values being stored in the min./max. memory 115 and T3 be the period of the clock CLK3 of the third clock generator 33.

Where the period T3 accords with the period T2, i.e. where the clock CLK2 is identical with the clock CLK3, the maximum and minimum values of each interval of FIG. 3(d) are successively recorded per advancing motion of the chart.

Where the period T3 is two times longer than the period T2, i.e. where the clock CLK3 has an inter-pulse spacing two times longer than that of the CLK2, the maximum and minimum values of two intervals are recorded for each advancing motion of the chart. In practice, however, in order to protect the thermal head, a maximum value and a minimum value are derived from the maximum and minimum data of two intervals and used as the recording data.

Incidentally, in the embodiment, the relationship between the periods of the clocks CLK3 and CLK2 is set to T3=m T2 (m=1, 2, 3, ... ). Actual recording or printing with the heating element groups of the thermal heads 14 and 24 is performed by turning on all heating elements located between the maximum value and the minimum value in relation to each interval, as shown in FIG. 3(f). Accordingly, controlled by the clock CLK3 of the third clock generator 33 are the first record processing unit 12, second record processing unit 22, first head driver 13, second head driver 23, and chart advancing means 36 for advancing the chart. Of course, the level meter 16 is controlled by the level meter driver 15 so that it indicates the data in synchronism with the clock CLK3.

The recording operation of the memory mode will now be described. In the memory mode, the second memory block 116 shown in FIG. 1 is put in operation, instead of the first memory block 113. In this case, the recorder performs two stages of operation: a data take-in stage (1) and a data recording stage (2). The operation of the data take-in stage will now be described.

At the beginning of operation of the memory mode, the user determines the sampling period. This is required because the storage capacity of the RAM 117 of the second memory block 116 is limited. For example, where the RAM 117 has a storage capacity of 8 K bytes, it can store a phenomenon of one-second duration if sampling is performed at a sampling period of 8 KHz.

Therefore, the user is required to directly set the sampling period or to previously set how long duration the phenomenon is to be stored. This setting is achieved by means of the system operation keyboard 37 of the recorder.

In accordance with the foregoing setting, the first processor 121 sends an instruction to the second clock generator 32, so that the second clock generator generates the sampling clock having a given period from the clock CLK2 and supplies it to the memory unit logic circuit 35. The memory unit logic circuit 35 successively samples each input analog signal on the basis of the sampling clock, and controls the channel blocks CH.1-CH.8 so that each second memory block 116 stores and holds the thus produced digital data only for a given interval of time. In the channel block CH.1, for example, the output of the successive approximation A/D converter 111 is sent through the serial/parallel converter 112 and stored in the RAM 117 of the second memory block 116 successively. In this way, the data can be stored in the second memory blocks of all 16 channel blocks CH.1-CH.8. Hence, the data take-in stage is completed.

Then, the data recording stage (2) is started.

In the data recording stage, the first processor 121 sends an instruction to the third clock generator 33. The third clock generator 33, whose clock CLK3 complies with the foregoing instruction, generates a certain clock to control the print period and the chart advancing speed. Further, the clock CLK3 of the third clock generator 33 acts on the RAM 117 of the second memory block 116 of each channel block under control of the corresponding processor 121 or 221 to cause the data stored in the RAM's to be successively sent to the corresponding record processing unit 12 or 22. Since the individual record processing units 12 and 22 and the chart advancing means 36 are supplied with the clock CLK3 of the third clock generator 33, due to their record processing and paper advancing functions, each analog recording signal is resultantly pictured or printed with the axis of time expanded by the ratio of the period of the clock CLK3 of the third clock generator 33 to the period of the sampling clock.

Figure 4A:
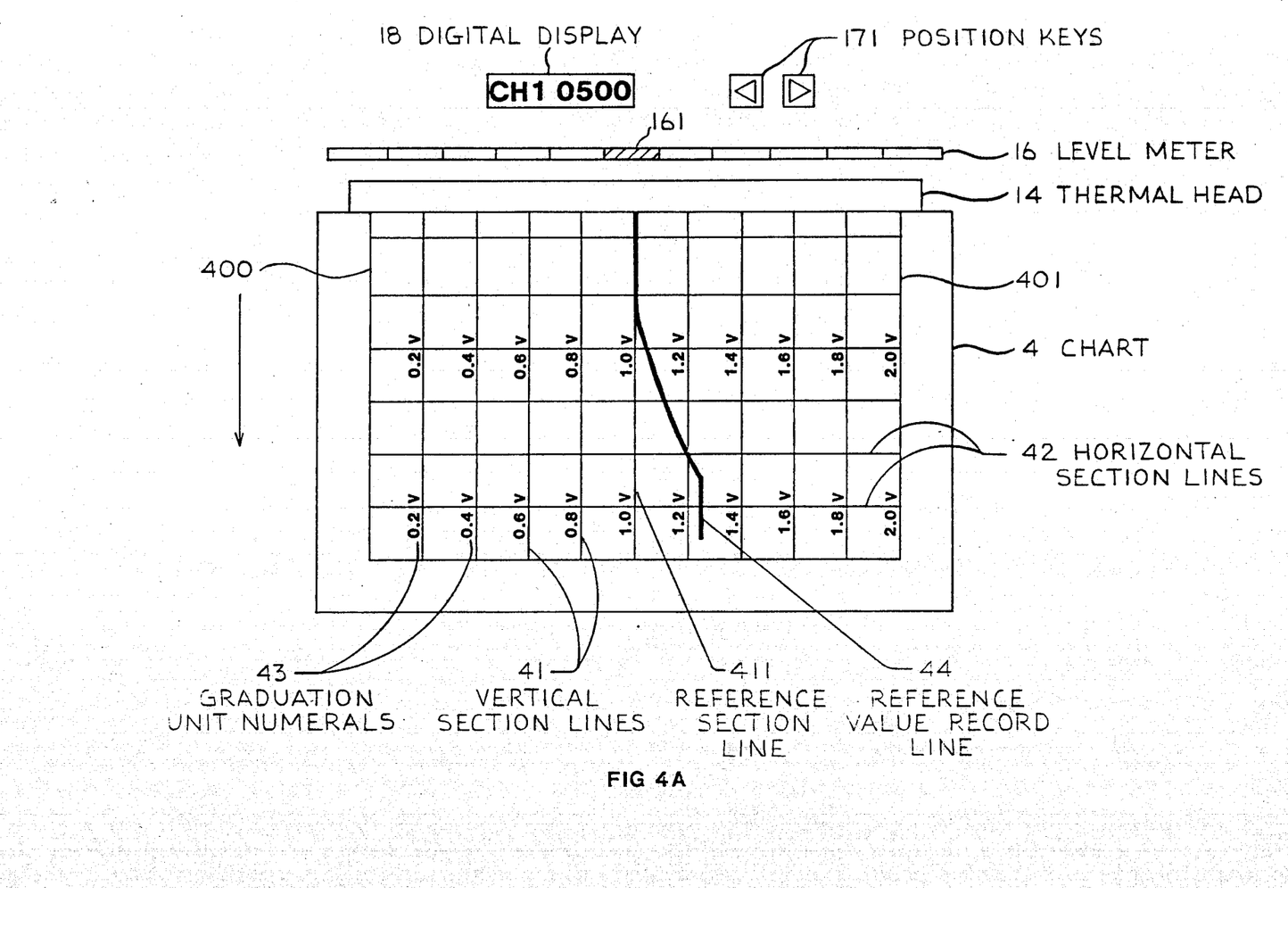
FIG. 4A is an explanatory diagram showing a system of setting a reference value in the form of an analog recording signal according to a preferred embodiment of the subject invention.

Now, referring to FIGS. 4A and 4B, the reference section (chart graduation or grid pattern) line setting system according to the present invention will be described which makes a section line and a reference value agree with each other on the chart. Since the setting operation is performed in the same manner for each channel each time of recording, the setting process for the channel block CH.1 only will be described.

The reference setting operation is performed prior to practical use of the recorder to enhance the accuracy of data recording.

At first, a section pattern selector switch provided in the system operation keyboard 37 is controlled to select a desired section pattern from those held in section pattern ROM 38, 124, 224 of the first record processing unit 12 and of the second record processing unit 22. Consequently, such a section line group or grid pattern as shown in FIG. 4A can be pictured on the chart. Although FIG. 4A shows only the display of the channel block CH.1 of the first recorder block, the other channel blocks and the second recorder block provide similar display. The section pattern consists, for example, of a group of vertical section lines 41 extending vertically with equal spacing and another group of horizontal section lines 42 extending horizontally and intersecting orthogonally with the vertical section lines, depending on the dimensions of the chart 4, particularly, the width thereof.

The recording of the section pattern on the chart 4 is performed by advancing the chart 4 step by step by the stepping motor 361 of the chart advancing means 36. In compliance with each advancing motion of the chart 4, the section pattern data for one line are delivered from the section pattern ROM 38 and recorded by the thermal heads 114 line after line.

In the foregoing operation, if it is desired to affix graduation unit numerals to the vertical section lines 41, the character generators 39 provided in the individual record processing units are actuated to print the graduation unit numerals 43 along the vertical section lines, which read 0.2v, 0.4v, 0.6V, ..., 2.0V in the drawing.

In relation to the section lines being recorded, an input analog signal of 1v, taken as a reference value, is applied to the individual channel blocks CH.1-Ch.4. In many cases, a record line 44 of the 1v reference value does not agree with a section line, defined as 1V, among those recorded on the chart 4, depending on the characteristics of individual components of each channel block, record processing unit and the like, the ambient temperature, etc. Such discrepancy is illustrated in FIG. 4A. In view of such circumstances and in order that the user can perceive or evaluate the recorded waveform accurately, it is necessary to make the reference section line 411 agree with the reference value record line 44.

Therefore, each position key 171, corresponding to each channel block, CH.1-CH.4 and CH.5-CH.8, provided in the operation keyboards of the first and second recorder blocks is controlled to make the 1V reference value record line 44 agree with the 1V-marked reference section line 411. In this connection, since the recorder embodying the present invention uses the thermal head 14 as a recording means which includes a large number of heating elements arranged in line, it is very difficult to determine whether or not the reference value record line 44 is accurately in agreement with the reference section line 411. Therefore, in the recorder embodying the present invention, the level meter 16 is turned on and off or flashed when the reference value record line 44 comes accurately into agreement with the reference section line 411 to notify the user of the agreement.

The system of flashing the level meter can be realized in such a manner as follows. Each processor of the individual record processing units of the recorder can appreciate the number of the heating element included in the thermal head 14 which records the reference section line 411, as well as the number of the heating element which records the reference value record line 44. To hold the ranking (in the form of a count value) of the heating element pertinent to the recording of the reference section line 411 and the ranking (in the form of a count value) of the heating element pertinent to the recording of the reference value record line 44, a memory is provided, such as in RAM 123 shown in FIG. 2A. Consequently, the level meter 16 can be turned on and off by incrementing/decrementing the count value by means of the position key 171 and applying an exciting signal to the level meter 16 when the agreement with the ranking of the heating element pertinent to the reference section line 411 is reached. In the recorder embodying the present invention, specifically, a level meter element 161 located close to the reference section line 411 is turned on and off.

With the foregoing configuration, it is possible to make the section line group and the recorded waveform of the input analog signal harmonize accurately with each other on the chart, thereby allowing precise reading of the recorded waveform.

Figure 4B:
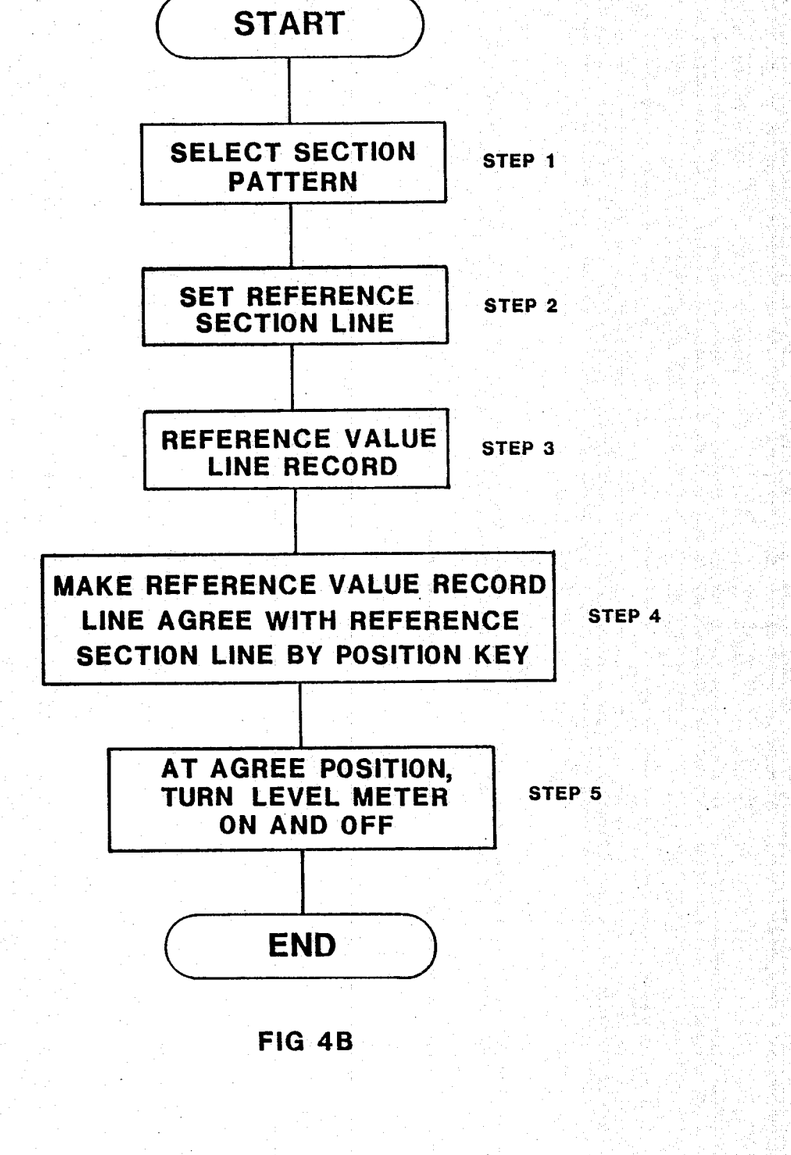
FIG. 4B is a flowchart showing the process of the reference value setting system.

FIG. 4B is a flowchart showing the process of making the reference section line 411 and the reference value record line 44 agree with each other.

In the first step, the section pattern to be recorded on the chart 4 is selected. This selection is achieved by means of the system operation keyboard 37, the result of selection being transferred through the dual port RAM 34 to the first and second record processing units 12 and 22.

In the second step, the reference section line 411 is set in the section pattern. This setting, where 1v is selected as the reference value, means to designate the section line, regarded as corresponding to 1V, as the reference section line, and is achieved by means of the first recorder block operation keyboard 17 which may have left and right keys 171 for that purpose. In response to this setting, the memory of the recorder stores the ranking of the thermal head heating element which records the reference section line 411. The RAM 123 may be used for that purpose.

In the third step, instead of a signal to be measured which is to be subjected to waveform recording, an input voltage of certain voltage level (for example, a voltage level of 1V in case the user intends to perform waveform observation while using a voltage level of 1V as a reference) serving as a reference voltage is applied to an input terminal section, and may be recorded by the recorder. In particular, the recorder drives a recording element of the thermal head corresponding to the reference voltage level, thereby producing a record of the reference voltage level. At this moment, the ranking of the thermal head heating element which records the reference value is also stored in the memory of the recorder, such as in the RAM 123.

In general, the reference voltage level does not harmonize with the graduation lines due to slight fluctuations of electric circuit components and the like depending on the definition of the graduation lines, ambient conditions, etc.

In the fourth step, the recording position of the reference value record line 44 is shifted by means of the position key 171 in the operation keyboard 17 to make the record line 44 of the reference voltage level agree with the designated graduation line 411. However, where the thermal head generally has an element density of 8 dots/mm or 16 dots/mm, it is difficult to judge whether the perfect agreement has been reached or not. Accordingly, at the same time, the count value or ranking of the heating element for the reference value stored in the third step is incremented or decremented in accordance with that shift, and compared accordingly with the count value of the heating element for the reference section line 411 which was stored in the second step.

In the fifth step, when the ranking of the heating element recording the reference value comes into agreement with the ranking of the heating element recording the reference section line 411 as the result of the comparison performed in the fourth step, the level meter 16 is turned on and off (flashing), signifying such agreement.

Within the scope of the subject invention, conformance of the reference value or level with the grid pattern reference line may be established and confirmed without actually recording the reference value line 44 or even the grid pattern at that point.

In either case, the invention resides in a method of recording data on a chart with an elongate thermal recording head 14 having a plurality of clocked heating elements 114 thereacross. Pursuant to the above-described first step, or in any other manner within the scope of the invention, there is selected a coordinate grid pattern within which to record the data on the chart (FIGS. 4A, 4B).

According to the above mentioned second step, or in any other manner within the scope of the invention, a line of that grid pattern is established as a reference line recordable by one of the heating elements 114. A reference level corresponding to that reference line is provided as described above with respect to the third step of FIG. 4B, or in any other manner within the scope of the invention. The latter one heating element is then ranked in terms of position across the thermal recording head 14. Any discrepancy in ranking between that one heating element and a heating element of the thermal recording head 14 with which the reference level is recorded on said chart is noted, such as described above with reference to FIG. 4B, or in any other manner within the scope of the invention. Shifting keys 171 or equivalent means are employed for effecting a shifting in ranking pursuant to a noted discrepancy until the heating element with which the reference level is recorded (44) and the one heating element with which the reference line 411 of the grid pattern is recorded have become identical (see top of chart in FIG. 4A).

In the reference section line setting system, instead of using the level meter 16 for display, a digital display unit may be used. In this case, the recording position of the reference value record line 44 and the recording position of the reference section line 411 can be displayed in numeric form. By way of example, FIG. 4A shows a digital display 18 providing a numerical readout 0500 indicating a relative position of the recorded reference level in the grid pattern, such as for an information recording channel CH1.

Such or a similar digital readout may also be employed for establishing the reference line 411 at the center between lateral edges of said grid pattern. For instance, if a value of zero is assigned to one lateral edge 400 of the grid pattern, and a maximum value of units is assigned to the opposite lateral edge 401 of that grid pattern, then the reference line 411 can be established at one-half of that maximum value (e.g. at 0500 if the maximum value is 1000).

On the other hand, the reference line 411 can be established at any value selected between zero and said maximum value, such as by means of position keys of the type of keys 171 acting on the processor 121.

In this respect and in general, the grid pattern may be selectively expanded and reduced or contracted with respect to the chart, and the line 411 of the grid pattern may be retained as the reference line when selectively expanding and reducing the grid pattern. Such expansion and reduction is, for example, effected with the first processor 121 successively selecting stored grid patterns from the ROM 124, where such grid patterns preferably are stored in a succession of digital expansions, whereby selective expansion and reduction of the grid pattern may be effected in digital increments, such as by operation of the keyboard 37. This may proceed in cooperation with the processor 121 and the RAM 123 which stores the ranking of the thermal head heating element which records the reference line 411 as described above, so that such line may be retained as the reference line in successively selected grid patterns.

The latter aspect of the invention may be practiced independently. For instance, in a method of recording data on a chart with an elongate thermal recording head 14 having a plurality of clocked heating elements 114 thereacross, there may be selected a coordinate grid pattern within which to record data on the chart. As described above, a line of that grid pattern may be established as a reference line 411 recordable by one of the heating elements 114. That one heating element may then be ranked in terms of position across said thermal recording head, such as in the manner described above with respect to the fourth step in FIG. 4B, using the position keys 171, for instance.

The RAM 123 again stores information on the ranking of the one heating element with which the reference line 411 is recorded on the chart. The grid pattern may then be selectively expanded and reduced with respect to the chart, such as by use of the above mentioned pattern selector switch in the systems operations keyboard 37, causing a selection of the grid patterns stored in the ROM 124, preferably in digital increments. At the same time, information on the ranking of the reference line 411 stored in the RAM 123 is employed by the processor 121 to retain the line 411 of the grid pattern as the reference line when selectively expanding and reducing the grid pattern.

The subject extensive disclosure will render apparent or suggest to those skilled in the art various modifications and variations within the spirit and scope of the subject invention and equivalents thereof.

We claim:

1. In a method of recording data on a chart with an elongate thermal recording head having a plurality of clocked heating elements thereacross, the improvement comprising in combination the steps of:
   selecting a coordinate grid pattern within which to record said data on said chart;
   establishing a line of said grid pattern as a reference line recordable by one of said heating elements;
   providing a recordable reference level corresponding to said reference line;
   ranking said one heating element in terms of position across said thermal recording head;
   noting a discrepancy in ranking between said one heating element and the heating element of said elongate thermal recording head with which said reference level is recorded on said chart; and
   effecting a shifting in ranking of the heating element with which the reference level is recorded pursuant to a noted discrepancy until the heating element with which said reference level is recorded and said one heating element with which said reference line of the grid pattern is recorded have become identical.

2. A method as claimed in claim I, including the steps of:
   providing a selectively energizable flashing signal;
   monitoring said shafting of said ranking; and
   energizing said flashing signal in response to said monitoring when the ranking of the heating element with which said reference level is recorded is equal to the ranking of said one heating element with which said reference line of the grid pattern is recorded.

3. A method as claimed in claim 1, including the steps of:
   providing a level meter along a space across which said chart extends;
   monitoring said shifting of said ranking; and
   energizing said level meter in response to said monitoring at the location of said reference line to indicate when the ranking of the heating element with which said reference level is recorded is equal to the ranking of said one heating element with which said reference line of the grid pattern is recorded.

4. A method as claimed in claim 1, including the steps of:
   providing a numerical readout indicating a relative position of the recorded reference level in the grid pattern.

5. A method as claimed in claim 1, including the step of:
   establishing said reference line at the center between lateral edges of said grid pattern.

6. A method as claimed in claim 1, including the steps of:
   assigning a value of zero to one lateral edge of said grid pattern;
   assigning a maximum value of units to the opposite lateral edge of said grid pattern; and
   establishing said reference line at a value selected between zero and said maximum value.

7. A method as claimed in claim 1, including the steps of:
   assigning a value of zero to one lateral edge of said grid pattern;
   assigning a maximum value of units to the opposite lateral edge of said grid pattern; and
   establishing said reference line at one-half of said maximum value.

8. A method as claimed in claim 1, including the steps of:
   selectively expanding and reducing said grid pattern with respect to said chart; and
   retaining said line of the grid pattern as said reference line when selectively expanding and reducing said grid pattern.

9. A method as claimed in claim 8, including the step of:
   effecting selective expansion and reduction of said grid pattern in digital increments.

10. In apparatus for recording data on a chart, including an elongate thermal recording head having a plurality of clocked heating elements thereacross, the improvement comprising in combination:
   means for ranking said heating elements in terms of position across said thermal recording head;
   means for providing a coordinate grid pattern within which to record said data on said chart;
   means for establishing a line of said grid pattern as a reference line recordable by one of said heating elements;
   means for providing a reference level corresponding to said reference line and recordable by a heating element of said elongate thermal recording head;
   means connected to said ranking means for noting any discrepancy in ranking between the heating element with which the reference level is recorded and said one heating element which records the reference line;

means connected to said discrepancy noting means for effecting a shifting in ranking of the heating element with which the reference level is recorded pursuant to any noted discrepancy in said ranking; and means connected to said discrepancy noting means for indicating when said latter heating element with which the reference level is recorded and said one heating element with which said reference line in the grid pattern is recorded have become identical.

11. Apparatus as claimed in claim 10, wherein:

said discrepancy noting means include means for monitoring said shifting of said ranking; and said indicating means include means for providing a selectively energizable flashing signal and means connected to said monitoring means for energizing said flashing signal in response to said monitoring when the ranking of the heating element with which said reference level is recorded is equal to the ranking of said one heating element with which said reference line of the grid pattern is recorded.

12. Apparatus as claimed in claim 10, wherein:

said discrepancy noting means include means for monitoring said shifting of said ranking; and said indicating means include a level meter along a space across which said chart extends and means connected to said monitoring means for energizing said level meter in response to said monitoring at the location of said reference line to indicate when the ranking of the heating element with which said reference level is recorded is equal to the ranking of said one heating element with which said reference line of the grid pattern is recorded.

13. Apparatus as claimed in claim 10, including:

a level meter along a space across which said chart extends;

means for energizing said level meter to provide an indication of said reference line;

means for monitoring said shifting of said ranking; and means connected to said monitoring means and to said means of energizing said level meter to change said indication of the reference line in response to said monitoring to a signal confirming achievement of identity of the heating element with which said reference level is recorded with said one heating element with which said reference line of the grid pattern is recorded.

14. Apparatus as claimed in claim 10, including:

means for providing a numerical readout indicating a relative position of the recorded reference level in the grid pattern.

15. Apparatus as claimed in claim 10, including:

means for establishing said reference line at the center between lateral edges of said grid pattern.

16. Apparatus as claimed in claim 10, including:

means for assigning a value of zero to one lateral edge of said grid pattern and for assigning a maximum value of units to the opposite lateral edge of said grid pattern; and means connected to said assigning means for establishing said reference line at a value selected between zero and said maximum value.

17. Apparatus as claimed in claim 10, including:

means for assigning a value of zero to one lateral edge of said grid pattern and for assigning a maximum value of units to the opposite lateral edge of said grid pattern; and means connected to said assigning means for establishing said reference line at one-half of said maximum value.

18. Apparatus as claimed in claim 10, including:

means for selectively expanding and reducing said grid pattern with respect to said chart; and means for retaining said line of the grid pattern as said reference line when selectively expanding and reducing said grid pattern.

19. Apparatus as claimed in claim 10, including:

means for selectively expanding and reducing said grid pattern with respect to said chart in digital increments; and means for retaining said line of the grid pattern as said reference line when selectively expanding and reducing said grid pattern in digital increments.

20. In a method of recording data on a chart with an elongate thermal recording head having a plurality of clocked heating elements thereacross, the improvement comprising in combination the steps of:

selecting a coordinate grid pattern within which to record said data on said chart;

establishing a line of said grid pattern as a reference line recordable by one of said heating elements;

ranking said one heating element in terms of position across said thermal recording head;

storing information about said ranking;

selectively expanding and reducing said grid pattern with respect to said chart in digital increments; and retaining said line of the grid pattern as said reference line when selectively expanding and reducing said grid pattern.

* * * * *